No. 869,033. PATENTED OCT. 22, 1907.
J. H. VIOL.
WATER TRAP FOR CORNETS, &c.
APPLICATION FILED MAY 13, 1907.
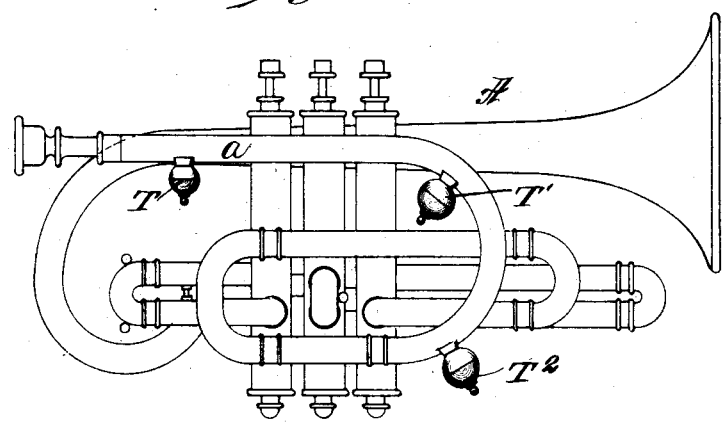
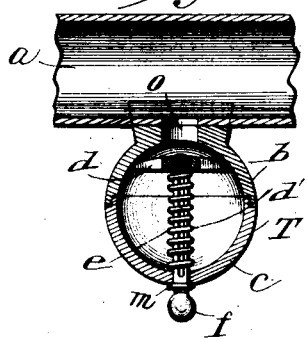
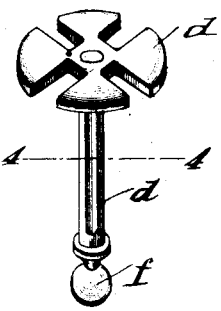
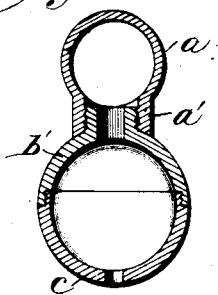
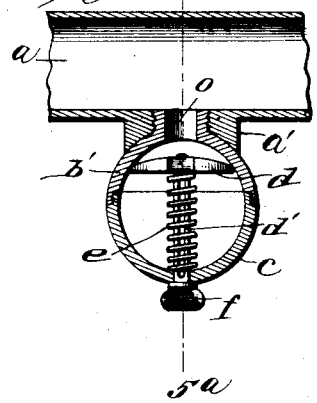
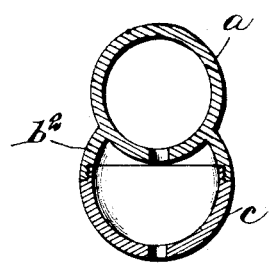
WITNESSES
INVENTOR
JOHN H. VIOL
BY
ATTORNEYS

UNITED STATES PATENT OFFICE.

JOHN H. VIOL, OF DEER LODGE, MONTANA, ASSIGNOR OF ONE-THIRD TO WILLIAM E. WERD, OF DEER LODGE, MONTANA, AND ONE-EIGHTH TO WILLIAM DYER AND ONE-EIGHTH TO WILLIAM SLEEMAN, OF BUTTE, MONTANA.

WATER-TRAP FOR CORNETS, &c.

No. 869,033.     Specification of Letters Patent.     Patented Oct. 22, 1907.

Application filed May 13, 1907. Serial No. 373,310.

*To all whom it may concern:*

Be it known that I, JOHN H. VIOL, a citizen of the United States, residing at Deer Lodge, in the county of Powell and State of Montana, have invented a new and useful Improvement in Water-Traps for Cornets, &c., of which the following is a specification.

In brass wind instruments of the trumpet style, it is common to provide at one or more points what is known as a water key, which is to be opened at intervals for blowing out the water which condenses in the horn from the breath of the performer. If this is not done this water accumulates in the air passages and valves, producing a gurgling and rattling effect that militates against the smoothness of the notes. It frequently happens, however, especially in long solos, that it is not practicable to blow out the accumulated water without making an awkward break in the music.

Efforts have heretofore been made to overcome this difficulty, and to that end a small water trap has been arranged in the line of the wind passages, adapted to take up the accumulated water without interfering with the wind passages or affecting the quality of the notes.

My invention is an improvement in this class of devices and consists in the novel construction and arrangement of the trap and in the means for discharging the water as will be hereinafter fully described with reference to the drawing, in which Figure 1 is a side view of a cornet equipped with three of my water traps. Fig. 2 is an enlarged section through one of the traps taken longitudinally of the tubular portion of the horn to which it is attached. Fig. 3 is a detail in perspective of the discharge valve and attached parts. Fig. 4 is an enlarged cross section of the shank of the valve, taken on line 4—4 of Fig. 3. Fig. 5 is a sectional view similar to Fig. 2, but showing a modification. Fig. 5ª is a cross section of Fig. 5, taken on line 5ª 5ª and Fig. 6 is a cross section similar to Fig. 5, but showing a further modification.

In Fig. 1 of the drawing, A is a cornet to which are applied in three places my trap devices, as seen at T, T', T². These trap devices are all external to or outside of the horn, being in the nature of attachments thereto.

The first trap T is placed just beyond the mouth piece and is preferably somewhat smaller than the others. The other two are placed further along the wind passage of the tube and all are attached on the lower side of the wind passage of the instrument when held in the position for blowing, so that gravity will carry the water into the traps.

The trap is constructed as shown in Fig. 2, in which $a$ is the tubular portion of the horn forming a part of the wind passage to which the trap is permanently applied. The trap consists of a hollow spherical chamber from 3/8 to 6/8 of an inch in diameter made of two hemispherical shells $b$ and $c$ detachably connected by a screw threaded joint. The part $b$ has a saddle-shaped reinforce on one side which is brazed to the tube $a$ and has a hole $o$ opening through a corresponding hole into the tube $a$. In the outer half $c$ of the shell is carried a plate in the form of a slotted disk $d$, a longitudinally grooved shank $d'$ screwed into the disk and a terminal knob $f$ forming a handle which latter together with collar $m$ is outside of the shell.

Around the shank $d'$ is wound a spiral spring $e$ which at its lower end bears against the bottom of the shell $c$ and at the top bears against the disk $d$. This serves to hold said disk $d$ close up to the opening $o$ into the wind passage of the tube, but does not close it tightly, owing to the slots in the disk, as seen in Fig. 3. This allows the water as it accumulates in the tube $a$ to pass down through the hole $o$ into the trap where it is retained, while the disk $d$, approaching the hole as closely as it does, acts as an obstruction to meet and oppose the air vibrations so as to practically confine them to their proper wind passages without falsifying the note by the increase in volume which the chamber gives. The spring $e$ also holds the collar $m$ tightly up against the bottom of the shell $c$ forming a valve which is opened by pulling the knob downwardly.

The spherical shell of the trap is made large enough to retain all the water which may accumulate in playing any ordinary composition of music, and for such purpose a diameter of about one half inch will be sufficient and will not affect the looks or interfere in any degree with the proper working of the instrument. On the contrary, it lends an ornamental effect to the same.

At the conclusion of the rendering of a musical composition on the horn, the water is drained out of the trap and for this purpose it is only necessary to draw out the stem $d'$ by means of the knob handle $f$, so that the grooves in the said shank pass below the shell and the water will then drain away, or if desired, the hemispherical shell $c$ may be unscrewed. When the valve is held up by the spring, the shoulder or collar $m$ is held tightly up against the opening in the bottom of the shell and retains the water against leaking.

In using my invention, I may modify the means of attachment, as seen in Figs. 5 and 5ª, in which a reinforce $a'$ is formed on the tube $a$ and the upper half of the shell $b'$ has a screw threaded nipple turning into the screw thread of the reinforce. I may also modify the means of attachment, as seen in Fig. 6, in which the upper hemispherical shell $b^2$ is brazed directly on to the tube $a$ without a reinforce.

It will be understood that these traps are in the nature of small storage reservoirs which, while taking up and holding the condensed water, do not falsify the notes by increasing the effective volume of the wind passages, as the obstruction plate confines the vibrations to the normal wind passages. Any number of the traps may be employed and they may be of any desired shape. By making the shell in two separable sections, the insertion of the obstruction plate is made easy and the attachment may be made to any instrument with no injury to the same and with but little alteration.

My invention is applicable to all kinds of wind instruments which are blown, and especially horns of the trumpet type, such as cornets, French horns, altos, tenors, baritones, trombones and basses and my device may be applied to as many places as is rendered desirable by the kind or character of the horn.

I claim

1. A reservoir trap for wind instruments, consisting of a closed chamber having an inlet opening and an obstruction member partly closing communication through said inlet opening and contained within said chamber.

2. A reservoir trap for wind instruments, consisting of a closed chamber made in two separable parts, one having an inlet opening and the other an outlet opening, an obstruction member partly closing communication through the inlet opening, and a spring seated valve arranged on the outer part of the chamber.

3. A reservoir trap for wind instruments, consisting of a closed chamber having an inlet opening on one side thereof and an outlet opening on the other, a valve stem arranged within the chamber and having an obstruction member opposed to the inlet opening to exclude the air vibrations but allow water to pass and an external knob and collar attached to the valve stem and forming an outlet valve.

4. A reservoir trap for wind instruments, consisting of a two-part closed chamber having an inlet opening on one side, an obstruction member arranged opposite said opening and near thereto, a grooved shank connected to the obstruction member and extending through the wall of the chamber and having an external collar and operating handle and a spiral spring wound about said shank and arranged to force the same inwardly.

5. A reservoir trap for wind instruments, consisting of two hemispherical shells having connecting screw threads and an inlet opening and an obstruction member for the inlet opening arranged within the chamber formed by said shells.

6. A reservoir trap for wind instruments, consisting of a hollow chamber having an inlet opening on one side adapted to be connected with the air passages of the wind instrument, and an obstruction member contained within said chamber and formed as a disk-shaped head slotted and placed opposite to the inlet opening.

JOHN H. VIOL.

Witnesses:
H. H. MATTESON,
R. A. GRIFFITH.